(12) United States Patent  (10) Patent No.: US 8,538,255 B2
Kim  (45) Date of Patent: Sep. 17, 2013

(54) CAMERA WITH EASY MOUNTING DECORATION RING ASSEMBLY

(75) Inventor: Young-wook Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/268,059

(22) Filed: Oct. 7, 2011

(65) Prior Publication Data

US 2012/0189296 A1   Jul. 26, 2012

(30) Foreign Application Priority Data

Jan. 24, 2011  (KR) .................. 10-2011-0006958

(51) Int. Cl.
*G03B 17/00* (2006.01)
*G03B 11/00* (2006.01)

(52) U.S. Cl.
USPC .......................................... 396/535; 396/544

(58) Field of Classification Search
USPC .......... 396/535, 540, 541, 544; 348/373–375
See application file for complete search history.

(56) References Cited

U.S. PATENT DOCUMENTS 6,270,266 B1 *  8/2001  Fukuda et al. ................ 396/529
2011/0223969 A1 *  9/2011  Chou .......................... 455/556.1

FOREIGN PATENT DOCUMENTS

JP  2010145707 A  *  7/2010

OTHER PUBLICATIONS

JP2010-145707 A Machine Translation available from JPO website.*

* cited by examiner

*Primary Examiner* — WB Perkey
*Assistant Examiner* — Minh Phan
(74) *Attorney, Agent, or Firm* — Drinker Biddle & Reath LLP

(57) ABSTRACT

Cameras with an easy mounting decoration ring assembly are disclosed. A disclosed example camera includes a body; a barrel disposed in the body; a cover coupled to the body and including a through hole for externally exposing the barrel, and a recess unit extending along a circumferential direction by a predetermined length outside the through hole; and a decoration ring formed in a ring shape, coupled to the through hole of the cover to surround the barrel, and including a protrusion unit protruding toward the cover and inserted into the recess unit.

17 Claims, 7 Drawing Sheets

CAMERA WITH EASY MOUNTING DECORATION RING ASSEMBLY

CROSS-REFERENCE TO RELATED PATENT APPLICATION

This application claims the priority benefit of Korean Patent Application No. 10-2011-0006958, filed on Jan. 24, 2011, in the Korean Intellectual Property Office, the entirety of which is hereby incorporated by reference.

BACKGROUND

1. Field of the Disclosure

The present disclosure relates to cameras with an easy mounting decoration ring assembly, and more particularly, to cameras capable of conveniently coupling a decoration ring to a cover by inserting protrusion units of the decoration ring into recess units of the cover.

2. Description of the Related Art

Traditionally, a barrel including a lens and facing a subject is mounted on a camera, and a decoration ring is mounted on a cover of the camera to surround the barrel. As a component disposed on a front surface of a camera to determine an overall design of the camera, a decoration ring may be manufactured separately from a cover and then is coupled to the cover.

In general, a decoration ring may be coupled to a cover using an adhesive agent or adhesive tape. However, the coupled structure is vulnerable to heat and the adhesive agent or the adhesive tape may be high-priced. Also, if an adhesive agent or adhesive tape is used, because the distance between a cover and a decoration ring may not easily be uniformly maintained, a coupling process may not be easy and errors may occur. Furthermore, once a decoration ring is coupled to a cover, the decoration ring may not be easily separated from the cover and, thus, the decoration ring or the cover may not be easily replaced by a new one.

Most conventional cameras use a method using bolts to couple a decoration ring to a cover. However, because current compact cameras are getting smaller and thinner, using bolts may not be suitable. In other words, because compact cameras have very small spaces for components, a space for bolts and bosses to which the bolts are coupled may not be easily ensured.

SUMMARY

The present application discloses cameras capable of conveniently coupling a decoration ring to a cover.

The present application also discloses cameras capable of stably maintaining a coupled state of a decoration ring and a cover when the camera is assembled.

The present application further discloses cameras capable of easily separating a decoration ring from a cover, if necessary.

According to an aspect of the present disclosure, there is provided a camera including a body; a barrel disposed in the body; a cover coupled to the body and including a through hole for externally exposing the barrel, and a recess unit extending along a circumferential direction by a predetermined length outside the through hole; and a decoration ring formed in a ring shape, coupled to the through hole of the cover to surround the barrel, and including a protrusion unit protruding toward the cover and inserted into the recess unit.

The recess unit may extend by a first length greater than a second length of the protrusion unit, and the decoration ring may be coupled to the cover by inserting the protrusion unit into the recess unit and then rotating the decoration ring with respect to the cover.

The camera may further include a rotation prevention unit protruding from the body toward the cover and inserted into the recess unit to support the protrusion unit such that the decoration ring may not be rotated with respect to the cover.

The recess unit may extend along the circumferential direction and may be cut from a rim of the through hole outward, the cover may include a wing unit protruding from at least one side of the recess unit toward the through hole, and the protrusion unit may include an extension part extending from the decoration ring toward the cover, and a coupling part extending from the extension part in a circumferential direction of the decoration ring, and coupled to the wing unit.

The wing unit may include a recessed part in a surface contacting the coupling part, and a protruding part to be inserted into the recessed part may be formed on the coupling part.

The wing unit may include a protruding part on a surface contacting the coupling part, and a recessed part into which the protruding part is inserted may be formed in the coupling part.

The wing unit may include a sloped part for guiding the insertion into the coupling part, at an end toward the coupling part.

The recess unit may extend along the circumferential direction and may be cut from a rim of the through hole outward, the cover may include a coupling protrusion protruding from at least one side of the recess unit, and the protrusion unit may include an extension part extending from the decoration ring in a radial direction, and a coupling part extending from the extension part along a circumferential direction of the decoration ring, and coupled to the coupling protrusion.

The decoration ring may be formed of an electrically conductive material, and may further include a ground unit protruding toward and connected to the body.

BRIEF DESCRIPTION OF THE DRAWING

The above and other features and advantages of the present disclosure will become more apparent by describing in detail exemplary embodiments thereof with reference to the attached drawing in which.

DETAILED DESCRIPTION

Hereinafter, the present application will be described in detail by explaining embodiments of the disclosure with reference to the attached drawing.

Figure 1:
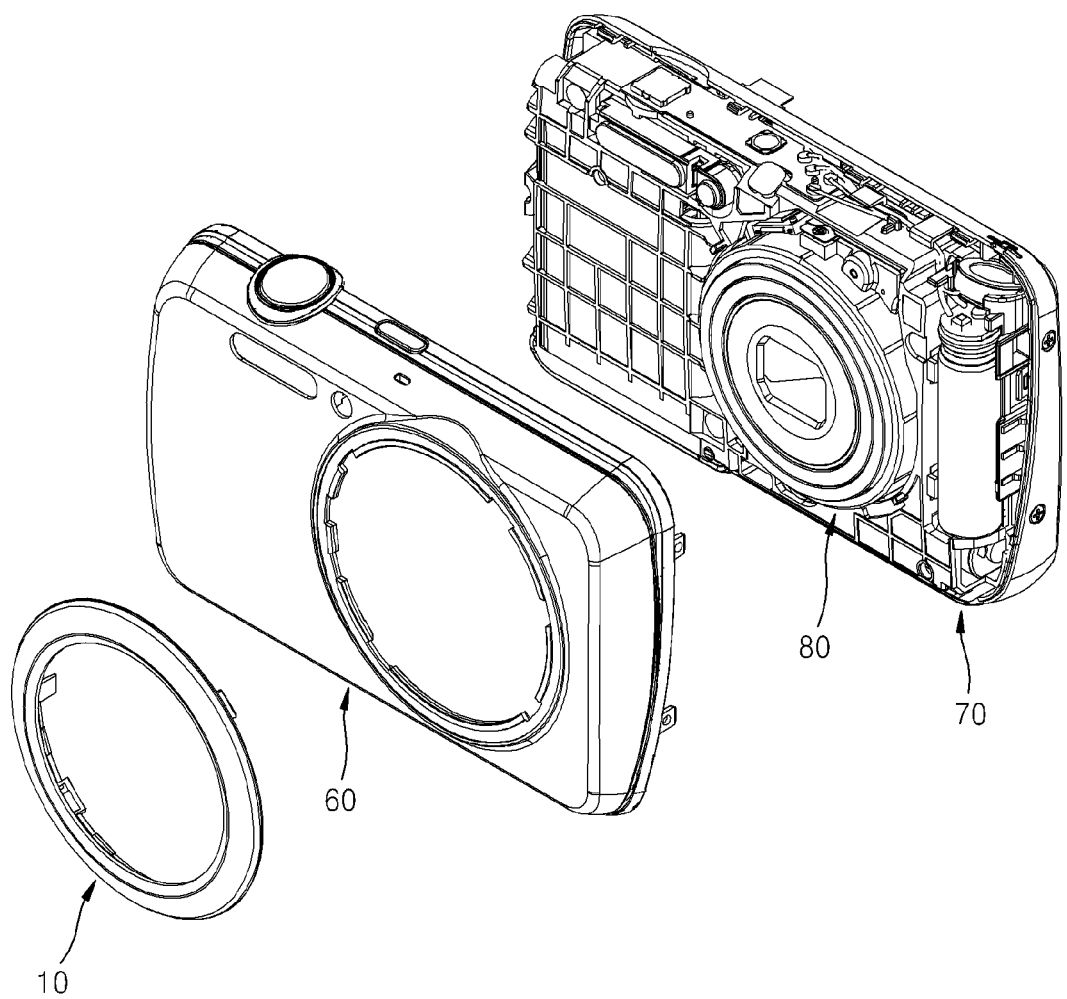
FIG. 1 is a partial exploded perspective view of a camera with an easy mounting decoration ring assembly, according to an embodiment of the present disclosure.
Figure 2:
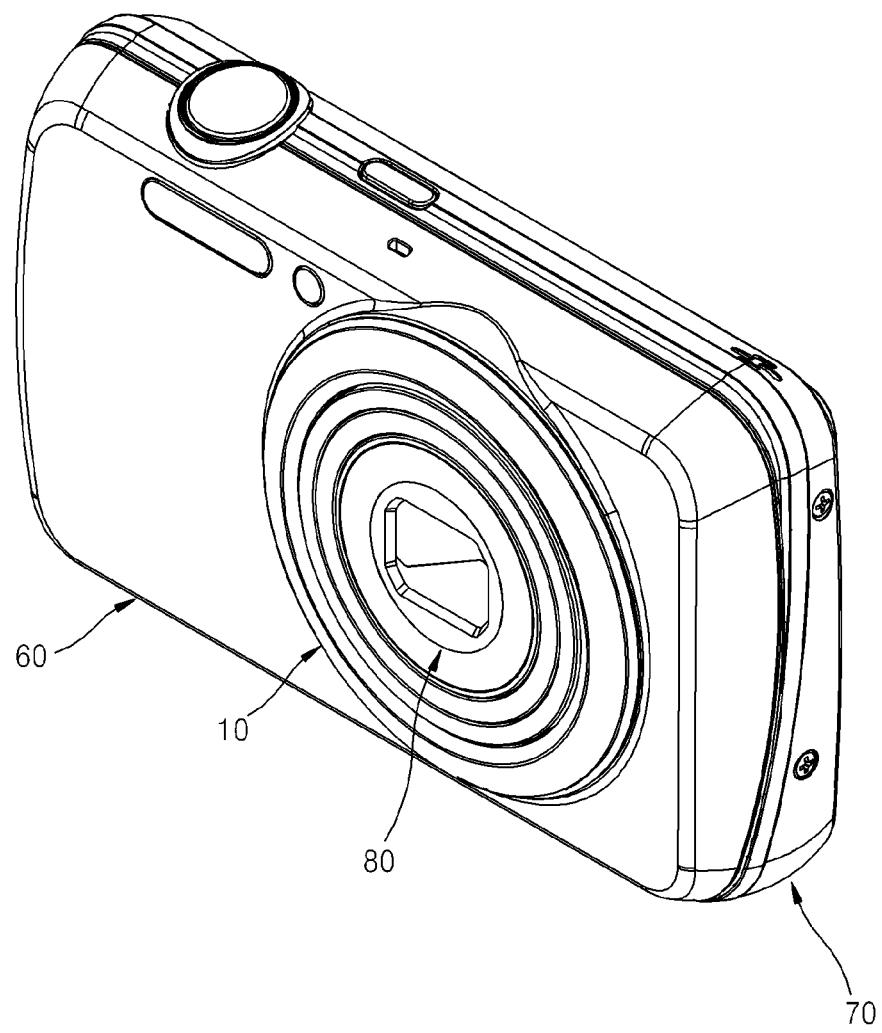
FIG. 2 is a perspective view of the camera illustrated in FIG. 1 when the camera is assembled.
Figure 3:
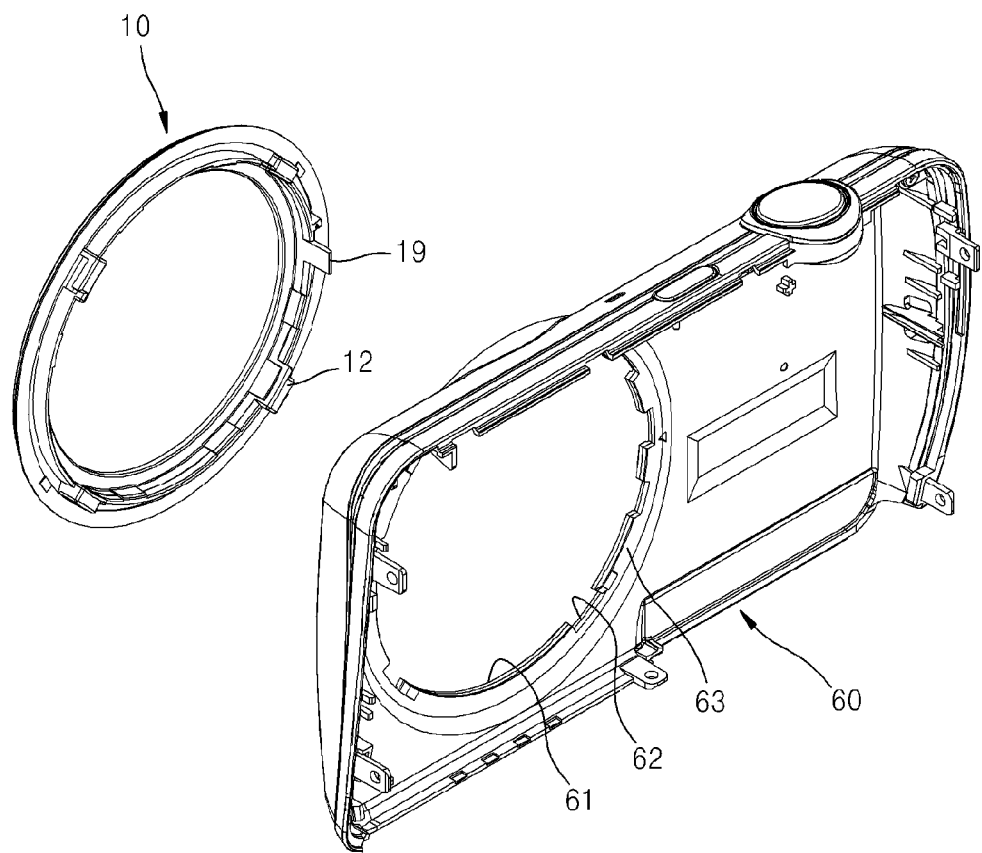
FIG. 3 is a perspective view showing coupling of a cover and a decoration ring for the camera illustrated in FIG. 1.

FIG. 1 is a partial exploded perspective view of a camera with an easy-mounting decoration ring assembly, according to an embodiment of the present disclosure. FIG. 2 is a perspective view of the camera illustrated in FIG. 1 when the camera is assembled. FIG. 3 is a perspective view showing coupling of a cover 60 and a decoration ring 10 for the camera illustrated in FIG. 1.

Referring to FIGS. 1 through 3, the camera includes a body 70, a barrel 80 disposed in the body 70, a through hole 61 of the cover 60 for externally exposing the barrel 80, the cover 60 coupled to the body 70, and the decoration ring 10 formed in a ring shape and coupled to the through hole 61 of the cover 60.

The barrel 80 including an optical element for receiving external light, e.g., a lens (not shown), is disposed in the body 70 of the camera.

The cover 60 formed of, for example, plastic and/or metal is coupled in front of the body 70. The cover 60 includes the through hole 61 for externally exposing the barrel 80. The cover 60 also includes a plurality of recess units 62 extending along a circumferential direction by a predetermined length outside the through hole 61. The recess units 62 are formed to be coupled to the decoration ring 10. The recess units 62 extend along the circumferential direction and are cut from a rim of the through hole 61 outward.

The shape of the recess units 62 is variously changeable and is not limited to the shape illustrated in FIGS. 1 through 3. For example, unlike the illustrations, instead of being cut from the rim of the through hole 61 outward, the recess units 62 may be formed as holes penetrating through the cover 60 at positions spaced by a predetermined distance from the rim of the through hole 61 outward.

The decoration ring 10 is coupled in front of the cover 60. The decoration ring 10 surrounds the barrel 80, is a path through which the barrel 80 moves forward and backward to, for example, perform a zoom function, and decorates a front part of the camera.

The decoration ring 10 may be formed of, for example, metal and/or plastic. The decoration ring 10 includes a plurality of protrusion units 12 protruding toward the cover 60 and inserted into the recess units 62. The protrusion units 12 are inserted into the recess units 62 to couple the decoration ring 10 to the cover 60.

The decoration ring 10 may be formed of an electrically conductive material, and may include a ground unit 19 protruding toward and connected to the body 70 of the camera. The ground unit 19 may be electrically connected to a ground circuit formed in the body 70 to guide a micro current generated outside the camera to flow to the ground circuit.

Figure 4:
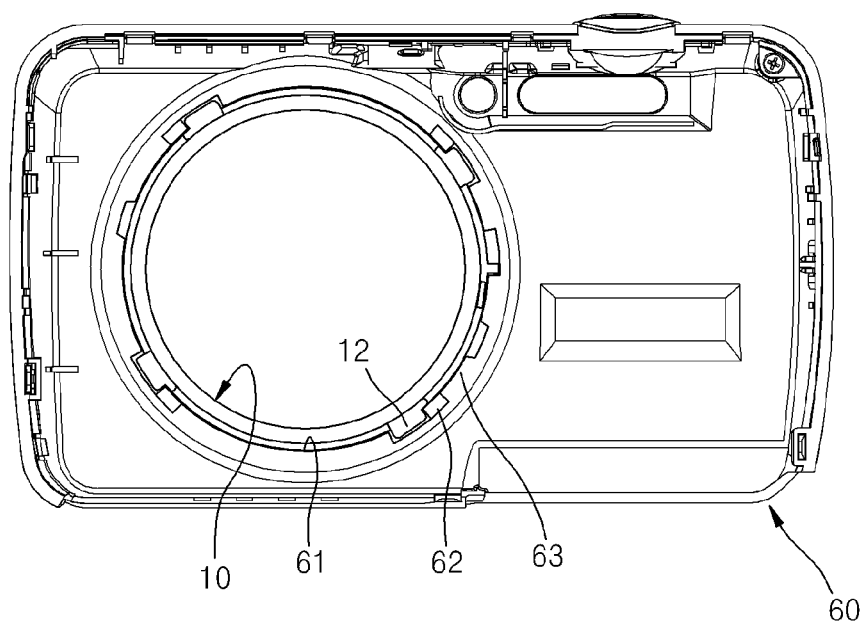
FIG. 4 is an operational view showing a coupling operation of the cover and the decoration ring illustrated in FIG. 3.
Figure 5:
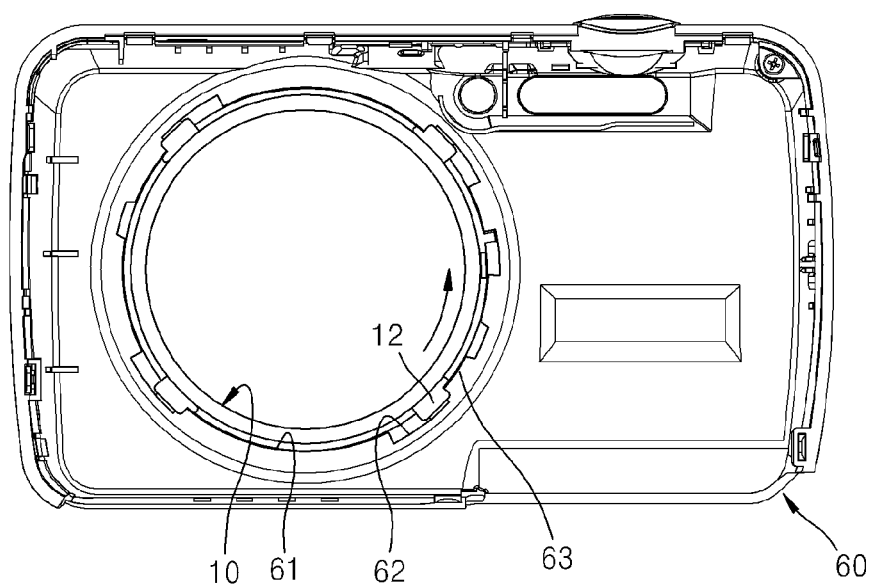
FIG. 5 is an operational view showing how the cover and the decoration ring illustrated in FIG. 4 are coupled to each other.
Figure 6:
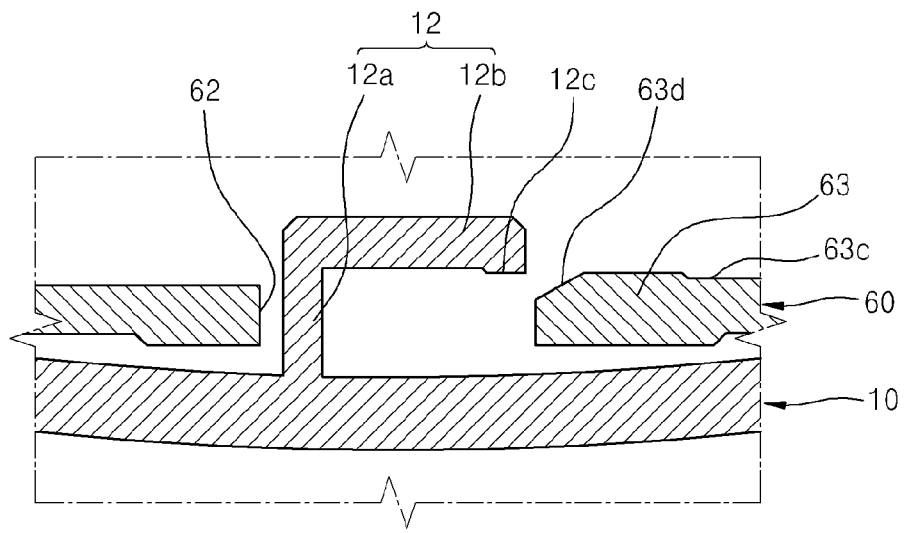
FIG. 6 is a side cross-sectional view showing the state of FIG. 4.
Figure 7:
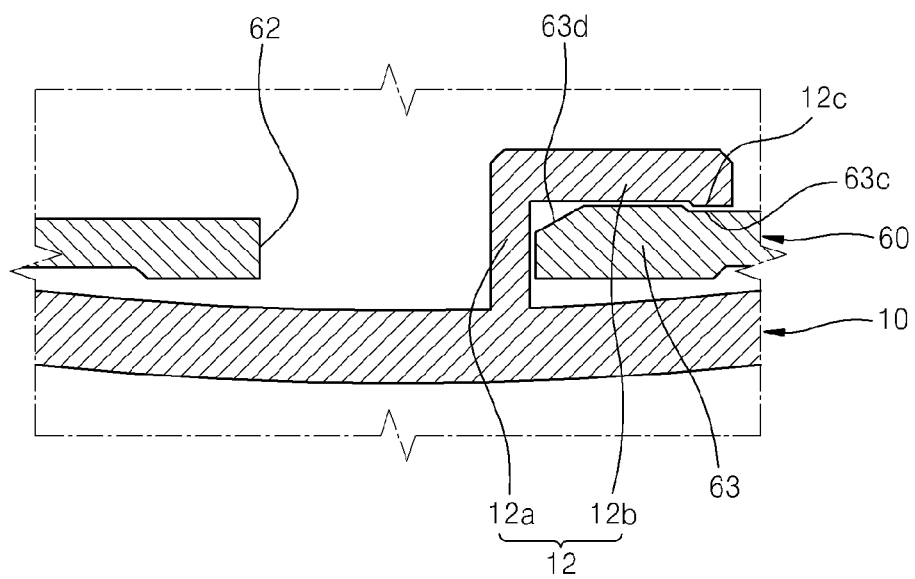
FIG. 7 is a side cross-sectional view showing the state of FIG. 5.

FIG. 4 is an operational view showing a coupling operation of the cover 60 and the decoration ring 10 illustrated in FIG. 3. FIG. 5 is an operational view showing how the cover 60 and the decoration ring 10 illustrated in FIG. 4 are coupled to each other. FIG. 6 is a side cross-sectional view showing the state of FIG. 4. FIG. 7 is a side cross-sectional view showing the state of FIG. 5.

The recess units 62 extend by a length greater than the length of the protrusion units 12. The decoration ring 10 is coupled to the cover 60 by inserting the protrusion units 12 into the recess units 62 and then rotating the decoration ring 10 with respect to the cover 60.

In order to couple the decoration ring 10 to the cover 60, if the protrusion units 12 of the decoration ring 10 are inserted into the recess units 62 of the cover 60 and then the decoration ring 10 is pressed toward the cover 60, the state illustrated in FIGS. 4 and 6 is achieved. In this state, if the decoration ring 10 is rotated in a counterclockwise direction with respect to the cover 60, as illustrated in FIGS. 5 and 7, the cover 60 and the decoration ring 10 may be fixed in a coupled state.

The cover 60 includes a plurality of wing units 63 protruding from sides of the recess units 62 toward the through hole 61. Each of the protrusion units 12 of the decoration ring 10 includes an extension part 12a extending from the decoration ring 10 toward the cover 60, and a coupling part 12b extending from the extension part 12a in a circumferential direction of the decoration ring 10, and coupleable to the wing unit 63. Due to the above-described structure of the protrusion units 12, and because the coupling part 12b and the extension part 12a may be flexibly deformed within small ranges, when the protrusion units 12 are coupled to the wing units 63, an end of the coupling part 12b is pushed away from the decoration ring 10 such that the wing units 63 are inserted into the coupling part 12b.

Each of the wing units 63 includes a recessed part 63c in a surface contacting the coupling part 12b, and a protruding part 12c to be inserted into the recessed part 63c is formed at the end of the coupling part 12b. Thus, when the wing unit 63 is completely inserted into the coupling part 12b, the protruding part 12c is inserted into the recessed part 63c such that the coupled state of the protrusion units 12 and the wing units 63 may be stably maintained, as shown in FIG. 7. The positions of the recessed part 63c and the protruding part 12c are not limited thereto, and the recessed part 63c may be formed at the end of the coupling part 12b and the protruding part 12c may be formed on the wing unit 63.

Each of the wing units 63 also includes a sloped part 63d for guiding the insertion into the coupling part 12b, at an end toward the coupling part 12b.

Figure 8:
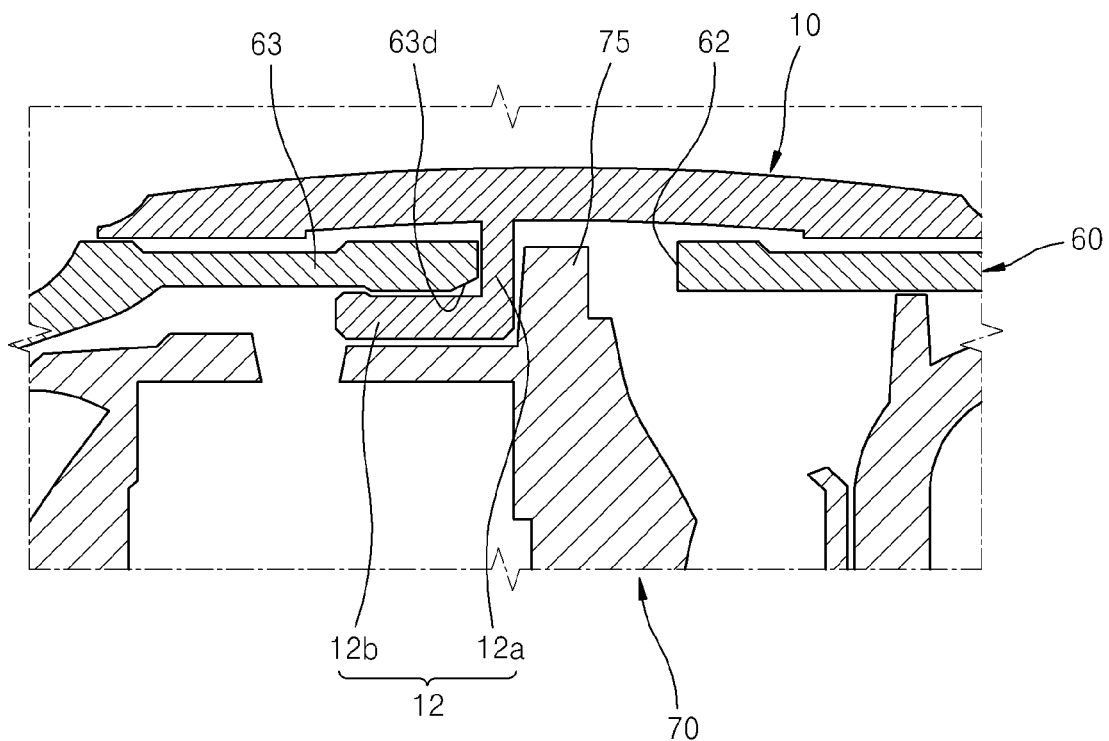
FIG. 8 is a side cross-sectional view showing that the cover to which the decoration ring is coupled as illustrated in FIG. 5 is mounted on the camera illustrated in FIG. 1.

FIG. 8 is a side cross-sectional view showing how the cover 60 to which the decoration ring 10 is coupled as illustrated in FIG. 5 is mounted on the camera illustrated in FIG. 1.

If the cover 60 to which the decoration ring 10 is coupled is coupled to the body 70 of the camera, the state illustrated in FIG. 8 is achieved. Rotation prevention units 75 protruding toward the cover 60 and the decoration ring 10 may be formed on the body 70. The rotation prevention units 75 are inserted into the recess units 62 of the cover 60 to support the protrusion units 12 such that the decoration ring 10 may not be rotated with respect to the cover 60.

When the cover 60 is not coupled to the body 70, the cover 60 and the decoration ring 10 may be separated from each other by rotating the decoration ring 10 with respect to the cover 60, with a predetermined force. However, as illustrated in FIG. 8, when the cover 60 is coupled to the body 70, because the rotation prevention unit 75 supports the extension part 12a of the protrusion unit 12, the decoration ring 10 may not be separated from the cover 60.

Due to the above-described structure, the cover 60 and the decoration ring 10 may be easily assembled together, and the coupled state of the cover 60 and the decoration ring 10 may be stably maintained when the camera is assembled. Also, because the decoration ring 10 is coupled to the cover 60 by inserting the protrusion units 12 of the decoration ring 10 into the recess units 62 formed at predetermined positions of the cover 60, the coupled state of the cover 60 and the decoration ring 10 may be stable and, thus, product reliability may be increased.

Figure 9:
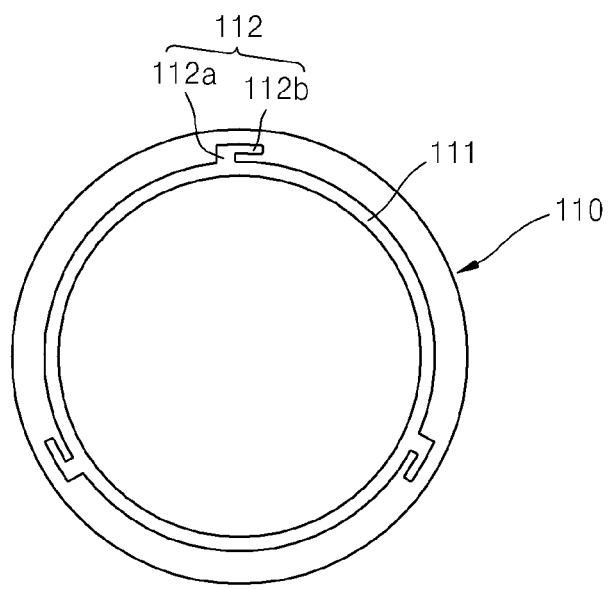
FIG. 9 is a rear view of a decoration ring of a camera, according to another embodiment of the present disclosure.
Figure 10:
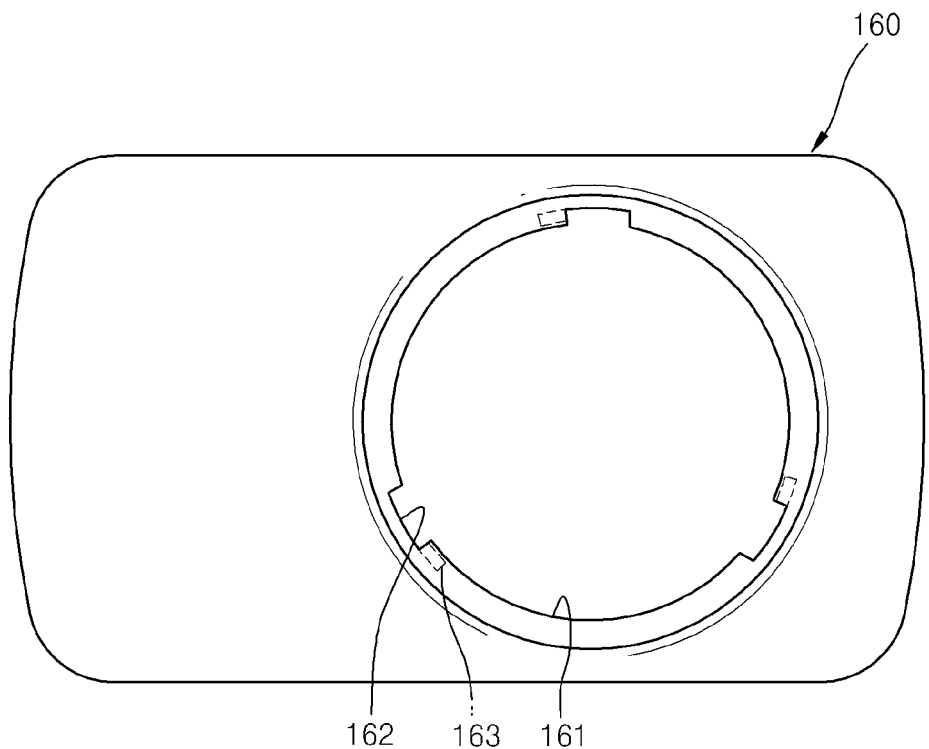
FIG. 10 is a front view of a cover of a camera, to which the decoration ring illustrated in FIG. 9 is coupled.
Figure 11:
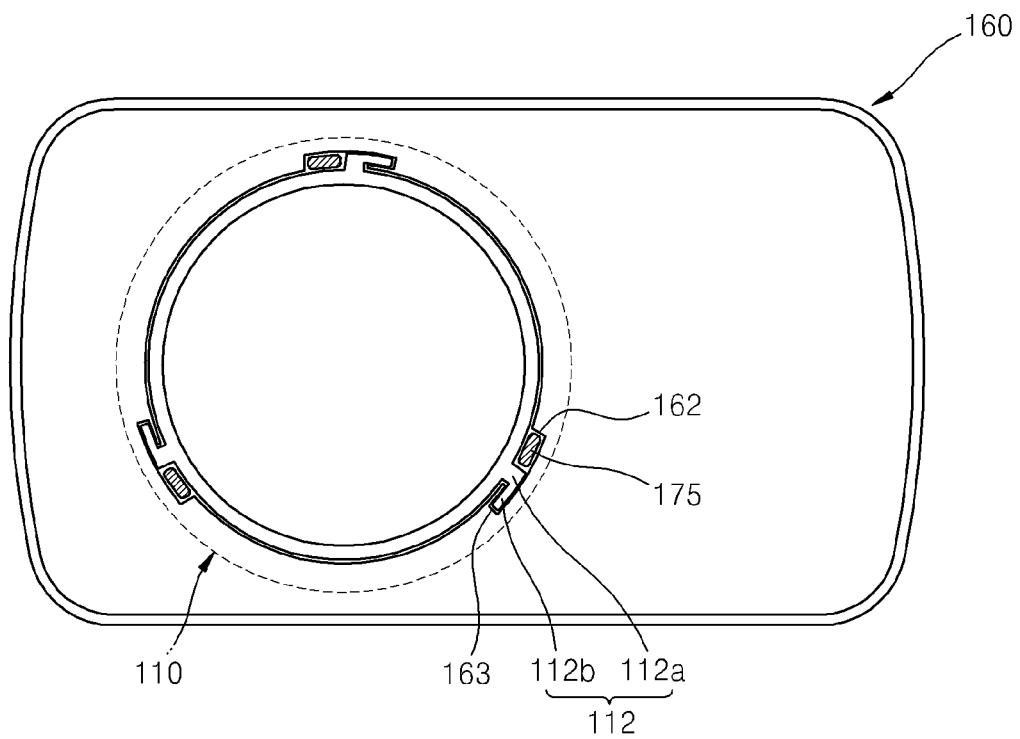
FIG. 11 is a rear view showing how the decoration ring illustrated in FIG. 9 is coupled to the cover illustrated in FIG. 10.

FIG. 9 is a rear view of a decoration ring 110 of a camera, according to another embodiment of the present disclosure. FIG. 10 is a front view of a cover 160 of the camera, to which the decoration ring 110 illustrated in FIG. 9 may be coupled. FIG. 11 is a rear view showing how the decoration ring 110 illustrated in FIG. 9 is coupled to the cover 160 illustrated in FIG. 10.

Referring to FIGS. 9 through 11, a direction of a plurality of protrusion units 112 is different from that of the protrusion units 12 illustrated in FIGS. 3 through 7.

The cover 160 includes a through hole 161 corresponding to a barrel of the camera, and a plurality of recess units 162 extending along a circumferential direction and cut from a rim of the through hole 161 toward outside the through hole 161.

The decoration ring 110 includes a flange 111 inserted into the through hole 161. The decoration ring 110 also includes the protrusion units 112 to be coupled to the cover 160. Each of the protrusion units 112 includes an extension part 112a extending from the flange 111 outward in a radial direction of the decoration ring 110, and a coupling part 112b extending from the extension part 112a by a predetermined length along a circumferential direction of the decoration ring 110.

The cover 160 includes a plurality of coupling protrusions 163 protruding from sides of the recess units 162. If the protrusion units 112 of the decoration ring 110 are inserted into the recess units 162 of the cover 160 and then the decoration ring 110 is rotated with respect to the cover 160, the coupling parts 112b of the protrusion units 112 engage with the coupling protrusions 163 and, thus, the decoration ring 110 becomes coupled to the cover 160. After that, if the cover 160 is coupled to a body of the camera, as illustrated in FIG. 11, rotation prevention units 175 formed in the body of the camera may become inserted into the recess units 162 to support the protrusion units 112. As such, when the cover 160 is coupled to the body of the camera, the coupled state of the cover 160 and the decoration ring 110 may be stably maintained.

In cameras with an easy mounting decoration ring assembly, according to the present disclosure, a decoration ring may be conveniently coupled to a cover by inserting protrusion units of the decoration ring into recess units of the cover. Also, because rotation prevention units protrude from a body of a camera to support the protrusion units, when the camera is assembled, the coupled state of the cover and the decoration ring may be stably maintained. Furthermore, if the cover is separated from the body of the camera, because the rotation prevention units supporting the protrusion units no longer engage the protrusion units, the decoration ring may be easily separated from the cover.

The devices described herein may comprise a memory for storing program data, a processor for executing the program data, a permanent storage such as a disk drive, a communications port for handling communications with external devices, and user interface devices including a touch panel, keys, buttons, etc. When software modules or algorithms are involved, these software modules may be stored as program instructions or computer-readable codes executable on the processor on a computer-readable medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the embodiments of this disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of this disclosure and are not intended to otherwise limit the scope of this disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of this disclosure unless the element is specifically described as "essential" or "critical".

The use of the terms "a" and "an" and "the" and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present disclosure is not limited to the described order of the steps. The use of any and all examples, or exemplary language (e.g., "such as" or "for example") provided herein, is intended merely to better illuminate this disclosure and does not pose a limitation on the scope of the appended claims unless otherwise claimed. Numerous modifications and adaptations will be readily apparent to those skilled in this art without departing from the spirit and scope of the present disclosure.

What is claimed is:

1. A camera comprising:
a body;
a barrel disposed in the body;
a cover coupled to the body and comprising a through hole for externally exposing the barrel, and a recess unit extending along a circumferential direction by a predetermined length outside the through hole; and
a decoration ring formed in a ring shape, coupled to the through hole of the cover to surround the barrel, and comprising a protrusion unit protruding toward the cover and inserted into the recess unit,
wherein the recess unit extends along the circumferential direction and is cut from a rim of the through hole outward,
wherein the cover comprises a coupling protrusion protruding from at least one side of the recess unit, and
wherein the protrusion unit comprises an extension part extending from the decoration ring in a radial direction, and a coupling part extending from the extension part along a circumferential direction of the decoration ring, and coupled to the coupling protrusion.

2. The camera of claim 1, wherein the recess unit extends by a first length greater than a second length of the protrusion unit, and
wherein the decoration ring is coupled to the cover by inserting the protrusion unit into the recess unit and then rotating the decoration ring with respect to the cover.

3. The camera of claim 2, further comprising a rotation prevention unit protruding from the body toward the cover and inserted into the recess unit to support the protrusion unit such that the decoration ring may not be rotated with respect to the cover.

4. The camera of claim 1, wherein the decoration ring is formed of an electrically conductive material, and further comprises a ground unit protruding toward and connected to the body.

5. A camera comprising:
a body;
a barrel disposed in the body;
a cover coupled to the body and comprising a through hole for externally exposing the barrel, and a recess unit extending along a circumferential direction by a predetermined length outside the through hole; and
a decoration ring formed in a ring shape, coupled to the through hole of the cover to surround the barrel, and comprising a protrusion unit protruding toward the cover and inserted into the recess unit,
wherein the recess unit extends along the circumferential direction and is cut from a rim of the through hole outward,
wherein the cover comprises a wing unit protruding from at least one side of the recess unit toward the through hole, and
wherein the protrusion unit comprises an extension part extending from the decoration ring toward the cover, and a coupling part extending from the extension part in a circumferential direction of the decoration ring, and coupled to the wing unit,
wherein the wing unit comprises a recessed part in a surface contacting the coupling part, and
wherein a protruding part to be inserted into the recessed part is formed on the coupling part.

6. The camera of claim 5, wherein the recess unit extends by a first length greater than a second length of the protrusion unit, and
wherein the decoration ring is coupled to the cover by inserting the protrusion unit into the recess unit and then rotating the decoration ring with respect to the cover.

7. The camera of claim 6, further comprising a rotation prevention unit protruding from the body toward the cover and inserted into the recess unit to support the protrusion unit such that the decoration ring may not be rotated with respect to the cover.

8. The camera of claim 5, wherein the wing unit comprises a sloped part for guiding the insertion into the coupling part, at an end toward the coupling part.

9. A camera comprising:
a body;
a barrel disposed in the body;
a cover coupled to the body and comprising a through hole for externally exposing the barrel, and a recess unit extending along a circumferential direction by a predetermined length outside the through hole; and
a decoration ring formed in a ring shape, coupled to the through hole of the cover to surround the barrel, and comprising a protrusion unit protruding toward the cover and inserted into the recess unit,
wherein the recess unit extends along the circumferential direction and is cut from a rim of the through hole outward,
wherein the cover comprises a wing unit protruding from at least one side of the recess unit toward the through hole, and
wherein the protrusion unit comprises an extension part extending from the decoration ring toward the cover, and a coupling part extending from the extension part in a circumferential direction of the decoration ring, and coupled to the wing unit,
wherein the wing unit comprises a protruding part on a surface contacting the coupling part, and
wherein a recessed part into which the protruding part is inserted is formed in the coupling part.

10. The camera of claim 9, wherein the recess unit extends by a first length greater than a second length of the protrusion unit, and
wherein the decoration ring is coupled to the cover by inserting the protrusion unit into the recess unit and then rotating the decoration ring with respect to the cover.

11. The camera of claim 10, further comprising a rotation prevention unit protruding from the body toward the cover and inserted into the recess unit to support the protrusion unit such that the decoration ring may not be rotated with respect to the cover.

12. The camera of claim 9, wherein the decoration ring is formed of an electrically conductive material, and further comprises a ground unit protruding toward and connected to the body.

13. The camera of claim 9, wherein the wing unit comprises a sloped part for guiding the insertion into the coupling part, at an end toward the coupling part.

14. A camera comprising:
a body;

a barrel disposed in the body;

a cover coupled to the body and comprising a through hole for externally exposing the barrel, and a recess unit extending along a circumferential direction by a predetermined length outside the through hole; and a decoration ring formed in a ring shape, coupled to the through hole of the cover to surround the barrel, and comprising a protrusion unit protruding toward the cover and inserted into the recess unit, wherein the recess unit extends along the circumferential direction and is cut from a rim of the through hole outward, wherein the cover comprises a wing unit protruding from at least one side of the recess unit toward the through hole, and wherein the protrusion unit comprises an extension part extending from the decoration ring toward the cover, and a coupling part extending from the extension part in a circumferential direction of the decoration ring, and coupled to the wing unit, wherein the wing unit comprises a sloped part configured to guide the insertion into the coupling part, at an end toward the coupling part.

15. The camera of claim 14, wherein the recess unit extends by a first length greater than a second length of the protrusion unit, and wherein the decoration ring is coupled to the cover by inserting the protrusion unit into the recess unit and then rotating the decoration ring with respect to the cover.

16. The camera of claim 15, further comprising a rotation prevention unit protruding from the body toward the cover and inserted into the recess unit to support the protrusion unit such that the decoration ring may not be rotated with respect to the cover.

17. The camera of claim 14, wherein the decoration ring is formed of an electrically conductive material, and further comprises a ground unit protruding toward and connected to the body.

* * * * *